United States Patent [19]

Olschansky

[11] Patent Number: 5,114,108
[45] Date of Patent: May 19, 1992

[54] DETACHABLE CONVENIENCE FOOD TRAY FOR VEHICLES

[76] Inventor: Craig A. Olschansky, 818 S. Brentwood, St. Louis, Mo. 63105

[21] Appl. No.: 301,645

[22] Filed: Jan. 25, 1989

Related U.S. Application Data

[63] Continuation-in-part of Ser. No. 193,386, May 12, 1988, abandoned.

[51] Int. Cl.⁵ .............................................. B65D 1/34
[52] U.S. Cl. .................................. 248/311.2; 248/214; 108/46
[58] Field of Search ....................... 248/311.2, 310, 215, 248/340, 214; 211/90, 75, 88; 108/44, 46

[56] References Cited

U.S. PATENT DOCUMENTS

| 1,872,491 | 8/1932 | Noetzel | 248/231.5 |
| 1,902,241 | 3/1933 | Jones | 248/340 |
| 1,974,213 | 9/1934 | Gilbert | 211/88 |
| 2,063,289 | 12/1936 | Alusas | 211/75 X |
| 2,101,686 | 12/1936 | Offutt | 108/46 |
| 2,123,257 | 7/1938 | Provost | 108/46 X |
| 3,229,946 | 1/1966 | MacKay | 108/46 X |
| 3,638,849 | 2/1972 | Goings | 108/44 X |
| 3,895,605 | 7/1975 | Goldman | 211/88 X |
| 4,560,128 | 12/1983 | Willeby et al. | 248/311.2 X |
| 4,620,488 | 11/1986 | Formo | 108/46 |
| 4,880,133 | 11/1989 | Cullinane | 248/229 X |

FOREIGN PATENT DOCUMENTS 1236 of 1892 United Kingdom ................ 248/215

Primary Examiner—Alvin C. Chin-Shue
Attorney, Agent, or Firm—Polster, Lieder, Woodruff & Lucchesi

[57] ABSTRACT

A one-piece molded plastic tray includes a generally flat surface forming a top level of the tray, with a plurality of integrally molded compartments depending from the generally flat surface. One of the compartments is shaped to accept a beverage container and another is shaped to accept a handheld food product such as french fries. A sandwich receiving area is defined on the generally flat surface and the surface has an upstanding peripheral wall section extending circumferentially at least part way around it. The tray further includes a supporting hook integrally attached to and supporting the tray. The hook is generally U-shaped and resilient to accommodate vehicle door frames of different sizes. The hook has an inner wall which is generally S-shaped and which deforms to accommodate vehicle door frames of various sizes yet has enough strength to hold the generally flat surface substantially perpendicular to the vehicle door frame when food items are placed on the tray.

6 Claims, 3 Drawing Sheets

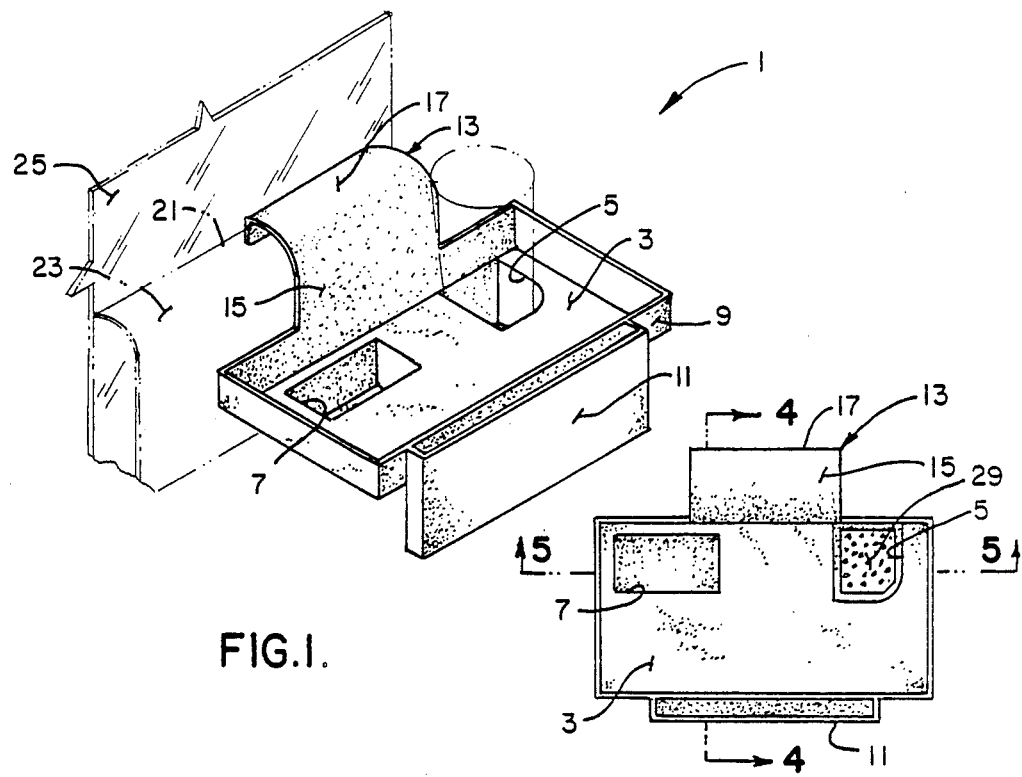
FIG.1.
FIG.2.
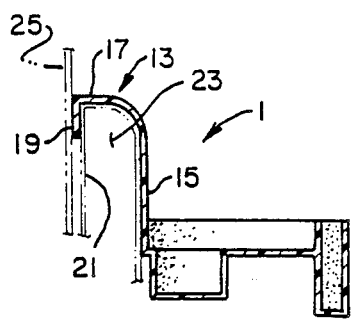
FIG.4.
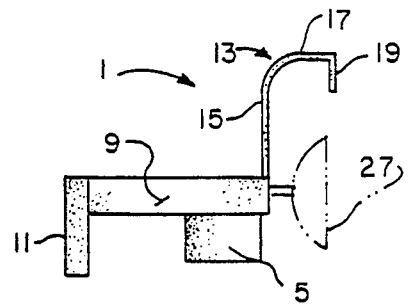
FIG.3.
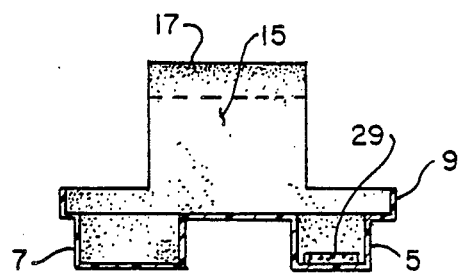
FIG.5.

1

DETACHABLE CONVENIENCE FOOD TRAY FOR VEHICLES

REFERENCE TO RELATED APPLICATION UNDER 35 U.S.C. 120

This application is a continuation-in-part of copending application Ser. No. 193,386 filed on May 12, 1988 for Detachable Convenience Food Tray for Vehicles.

BACKGROUND OF THE INVENTION

Industrial nations have produced mobile societies that are accustomed to the convenience and availability of personal automobiles. At the same time, fast food outlets cater to these mobile societies by offering reasonably priced, handheld convenience food products. Fast food outlets even offer "drive-thru" lanes where food can be ordered, picked up and paid for without leaving an automobile.

Where food obtained from "drive-thru" lanes of a fast food outlet is transported to an office, home, etc. before it is eaten, the food can be kept in the packaging provided by the fast food outlet until consumed. On the other hand, where the consumer desires to eat while driving, the packaging provided by the fast food outlet offers no convenient way of either supporting or holding food products while the consumer is operating an automobile.

The desire to eat while driving has prompted the development of many different types and kinds of individual and combined beverage and food holders for use in vehicles. Examples include beverage cup holders for vehicle doors such as shown in U.S. Pat. Nos. 3,128,983; 3,712,235; 4,606,523; 4,645,157 and 4,655,425. Other related patents disclose vehicle beverage and food trays attached to various interior parts of an automobile such as U.S. Pat. Nos. 3,331,494; 3,800,939; 3,606,112. In some instances, article support consoles for the area intermediate the two front seats of an automobile have included beverage and food compartments such as those shown in U.S. Pat. No. 3,110,397; 3,561,589; 3,771,554; 3,909,092; and 4,512,503.

Some vehicles do not have console areas intermediate the two front seats. Trays mounted in such areas are not particularly convenient to the driver while driving. Trays could be mounted on the instrument panel of the automobile, but there are a wide variety of instrument panels, making it difficult to find a common area to mount a convenience food tray. Despite these difficulties many drivers would use a detachable convenience food tray while driving, if available, particularly when food has been obtained from the "drive-thru" lanes of a fast food outlet.

SUMMARY OF THE INVENTION

Among the several objects and features of the present invention may be noted:

The provision of a detachable convenience food tray for vehicles;

The provision of such aforementioned detachable convenience food tray for vehicles which is a one-piece molded plastic tray that can be easily and securely mounted to the recessed area between a window and a vehicle door, while also being quickly and easily removed therefrom for storage;

The provision of such aforementioned detachable convenience food tray for vehicles which includes molded compartments for beverage containers, handheld food and napkins, as well as a tray for other types of handheld food products and the like;

The provision of such aforementioned detachable convenience food tray for vehicles wherein the beverage container compartment further includes a liquid absorbing pad for absorbing liquids spilled from beverage containers; and The provision of such aforementioned detachable convenience food tray for vehicles which is economical, is easy to manufacture and use, is durable and long lasting, readily accommodates to different types and kinds of vehicles, and is otherwise well adapted for the purposes described herein.

Other objects and features will be in part apparent and in part pointed out hereinafter.

Briefly, a one-piece molded plastic tray of the present invention includes a generally flat surface forming a top level of the tray and a plurality of integrally molded compartments depending from the generally flat surface. At least one of the compartments is generally shaped to accept a beverage container. Another of the compartments is generally rectangular in cross section to accept a handheld food product. A sandwich receiving area is defined on the generally flat surface, which area is of a size and shape to receive a handheld sandwich. The sandwich receiving area is disposed adjacent one of said integrally molded compartments. An upstanding peripheral wall section extends circumferentially at least partially around the generally flat surface and the molded compartments. The tray further includes a supporting hook section integrally attached to and supporting the tray along one side thereof. The supporting hook section has a generally U-shaped configuration including an inner wall portion adjacent to and extending upwardly from the tray, a connecting wall portion extending outwardly from the inner wall portion, and an outer wall portion extending downwardly from the connecting wall portion generally parallel to the inner wall portion. The outer wall portion is shaped, configured and dimensioned to be wedgingly and detachably received in the space between a vehicle door frame and associated door window in order to support the tray in a generally horizontal position while beverage containers and handheld food products are received within the molded compartments of the tray.

In a second aspect of the present invention, a one-piece molded plastic tray includes a generally flat surface forming a top level of the tray and a plurality of integrally molded compartments depending from the generally flat surface. At least one of the compartments is generally round in cross section to accept a beverage container and another of the compartments is generally rectangular in cross section to accept a handheld food product. A sandwich receiving area is defined on the generally flat surface generally on the top level of the tray. The sandwich receiving area is of a size and shape to receive a handheld sandwich and is disposed adjacent one of the integrally molded compartments. An upstanding peripheral wall section extends circumferentially at least partially around the generally flat surface and the molded compartments thereof. The wall section defines the periphery of at least part of the sandwich receiving area. The tray further includes a supporting hook section integrally attached to and supporting the tray along one side thereof. The supporting hook section has a generally U-shaped configuration including an inner wall portion adjacent to and extending upwardly from the tray, a connecting wall portion extending outwardly from the inner wall portion, and an outer wall portion extending downwardly from the connecting wall portion in generally parallel relationship to the inner wall portion. The outer wall portion is shaped, configured and dimensioned to be wedgingly and detachably received in the space between a vehicle door frame and associated glass window in order to support the tray in a generally horizontal position while beverage containers and handheld food products are received within the molded compartments of the tray. The inner wall portion is generally S-shaped and is composed of a resilient material which deforms to accommodate vehicle door frames of various sizes yet has enough strength to hold the generally flat surface substantially perpendicular to the vehicle door frame when food items are placed thereon.

BRIEF DESCRIPTION OF THE DRAWINGS

In the drawings, FIG. 1 is a perspective view of a detachable convenience food tray for vehicles which is constructed in accordance with the teachings of the present invention;

FIG. 2 is a top plan view of the detachable convenience food tray for vehicles as shown in FIG. 1;

FIG. 3 is a side elevational view of the detachable convenience food tray for vehicles as shown in FIG. 1;

FIG. 4 is a sectional view of the detachable convenience food tray as viewed along line 4—4 of FIG. 2;

FIG. 5 is a sectional view of the detachable convenience food tray as viewed along lines 5—5 of FIG. 2;

Similar reference numerals indicate similar parts throughout the various views of the drawings.

DESCRIPTION OF THE PREFERRED EMBODIMENTS

Figure 6:
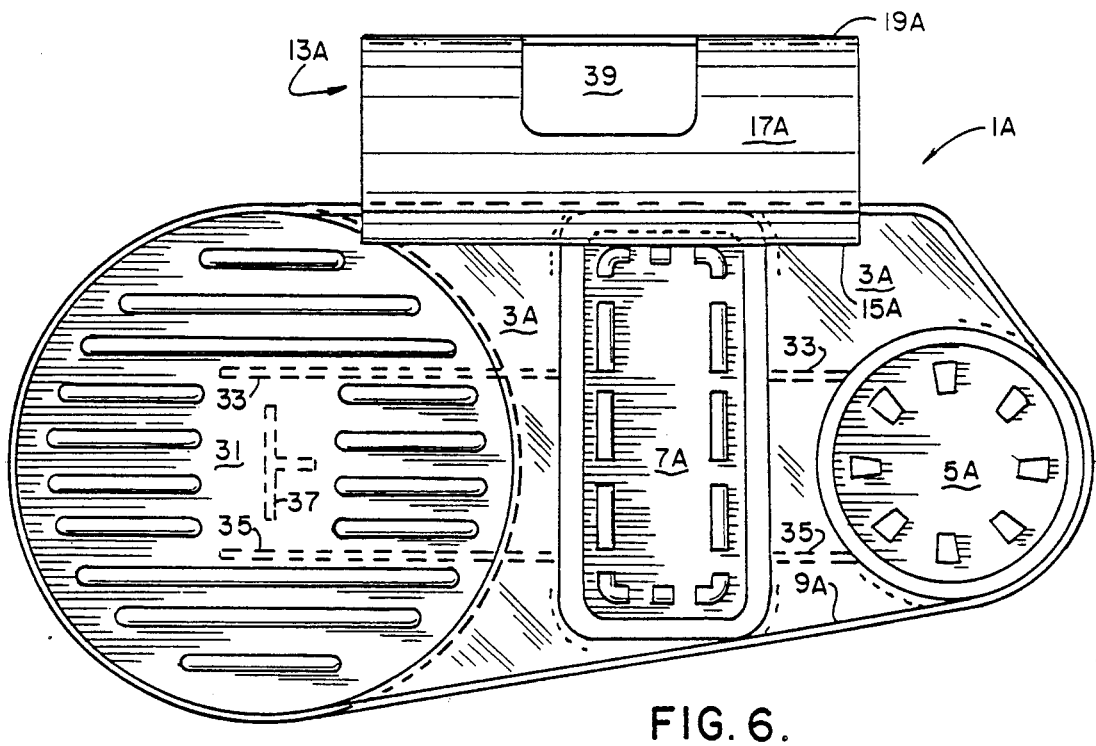
FIG. 6 is a top plan of a second embodiment of the tray of the present invention.

A detachable convenience food tray 1 of the present invention (FIGS. 1-5) is designed for use on a vehicle door and is constructed as a one-piece molded plastic body from any suitable plastic material. The one-piece plastic molded tray 1 includes a flat, generally horizontally extending and rectangularly-shaped supporting surface 3 defining a top level of the tray into which a plurality of molded compartments 5 and 7 are formed for receiving various food products. Molded compartment 5 is shown as shaped to receive a beverage container therein, as seen in FIG. 1, while molded compartment 7 may be designed to receive a handheld food product such as french fries, for example. Compartments 5 and 7 extend downwardly from flat surface 3 so that the items placed in those compartments have their bases below the top level of the tray. Each of the molded compartments 5 and 7 are formed in the shape and dimension to suit the particulars desired.

Surrounding the generally horizontally extending and rectangularly-shaped supporting surface 3 is an upstanding peripheral wall section 9 which extends circumferentially thereabout. The upstanding peripheral wall section 9 also serves to define surface 3 for receiving food products and the like, such as a handheld sandwich which can be deposited upon and supported by the generally horizontally extending supporting surface 3, until consumed. An elongated compartment 11 is integrally attached to an outside surface of the upstanding peripheral wall section 9. The elongated compartment 11, in this embodiment of the invention, has been designed to receive a paper napkin, thereby facilitating availability and use of the napkin by the automobile operator. The elongated napkin compartment 11 is thus closely positioned to the operator/consumer for ready use when needed.

On the opposite side of one-piece plastic molded tray 1 from elongated compartment 11 is a supporting hook section 13 which is integrally attached to and supports the one-piece plastic molded tray 1. The supporting hook section 13 has a generally U-shaped configuration including an inner wall portion 15 which is integrally attached to the upstanding peripheral wall section 9 and extends upwardly therefrom. Inner wall portion 15 of U-shaped supporting hook section 13 is thereby rigidly supported by the upstanding peripheral wall section 9 of one-piece plastic molded tray 1. A connecting wall portion 17 extends generally outwardly from inner wall portion 15 and is connected to an outer wall portion 19 (FIGS. 3 and 4) which extends downwardly from connecting wall portion 17 in generally parallel relationship to inner wall portion 15. The outer wall portion 19 is shaped, configured and dimensioned to be wedgingly and detachably received in the space 21 between a vehicle door frame 23 and associated glass window 25, in order to support the tray 3 in a generally horizontal position while beverage containers, handheld food products and the like are received within the molded compartments of the tray 1, as shown in FIGS. 1 and 4 of the drawings.

Since the shape of vehicle door frames 23 may vary, the U-shaped supporting hook section 13 is designed to be somewhat resiliently expandable to generally conform to the vehicle door frame when mounted thereto. To assist in the resilient expansion of the supporting hook section 13, suitable integrally molded folds or pleats, for example, may be provided in the supporting hook section 13 to facilitate the resilient expansion thereof.

In the design shown in the preferred embodiment of the drawing, the one-piece plastic molded tray has the molded compartment 5 shaped to receive and support a beverage container therein, as shown in FIG. 1 of the drawing. In the bottom wall of the molded compartment 5, a liquid absorbing material 29, such as a sponge-like material, may be used to absorb any liquid leakage or condensation from the beverage container. Thus, a consumer who is operating an automobile may lift the beverage container from the molded compartment 5, without being concerned that any liquid would fall on the user's clothes or the automobile seat.

The molded compartment 7, in the design illustrated in the drawing, has been shaped and conformed to receive a french fries container or the like so as to support same in upright position, to facilitate removing individual fries from the french fry container during operation of the automobile.

Between the molded compartments 5 and 7 of the one-piece plastic molded tray 1 and within the periphery of the upstanding peripheral walls section 9 is a further area permitting a handheld sandwich to be deposited on the horizontally extending and generally rectangular shaped supporting surface 3. Thus, the upstanding peripheral wall section 9 also serves to define a compartment for a food product.

As shown in the illustrated embodiment, the supporting hook section 13 extends along one side of the one-piece molded tray 1 approximately one-half the length thereof, but this may be lengthened to increase the support, or shortened for economical purposes, as may be desired. In addition, supplemental means in the form of a suction cup 27 (FIG. 3) or the like may be used for assisting in mounting the one-piece plastic molded tray 1 relative to the vehicle door frame 23. Other equivalent structure may be used, as desired.

A second embodiment of the detachable convenience food tray of the present invention, labelled IA, is shown in FIGS. 6-9. It is also constructed as a one-piece molded plastic body from any suitable plastic material. For purposes of brevity, similar parts in FIGS. 6-9 are labelled with the suffix "A" if they correspond to parts in FIGS. 1-5. Only the parts which differ from the embodiment of FIGS. 1-5 are described in detail.

Beverage accepting compartment 5A of this embodiment is generally round in cross section and extends downwardly from the top level of the tray defined by flat surface 3A. Similarly, french fry package accepting compartment 7A is generally rectangular in cross section and extends downwardly from surface 3A as well, although not as far as compartment 5A. It should be noted that in this embodiment, the handheld sandwich receiving area (labelled 31 in FIGS. 6-9) is well-defined.

In this embodiment, the sandwich receiving area, the french fry compartment, and the beverage compartment are lined up in that order, and the width of the tray decreases or tapers somewhat as one moves from one to the other. Of course, other configurations are possible.

It should also be noted that the various compartments have slits cut into them, which reduces the weight and expense of the tray. Reinforcing ribs 33 and 35 extend longitudinally along the under-surface of the tray to provide structural support for the tray. A reinforcing post 37 disposed under sandwich receiving area 31 serves the same purpose.

Figure 8:
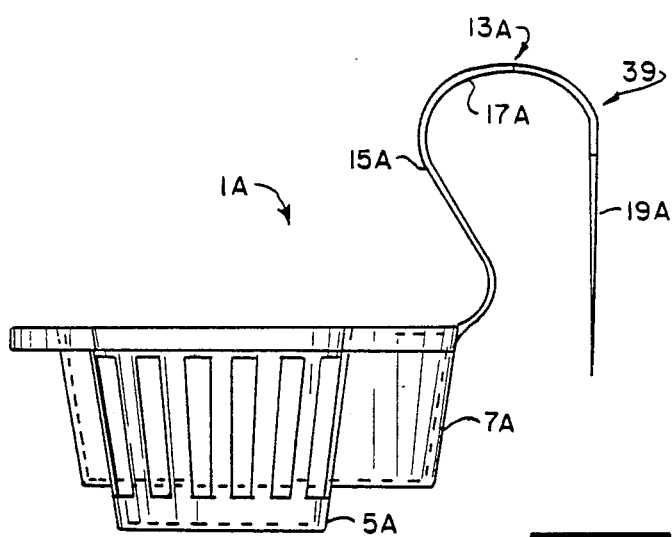
FIG. 8 is a right side elevation of the tray of FIG. 6.
Figure 9:
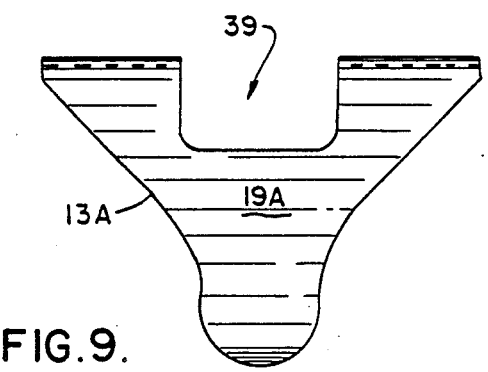
FIG. 9 is a rear elevation of the support hook portion of the tray of FIG. 6.
Figure 7:
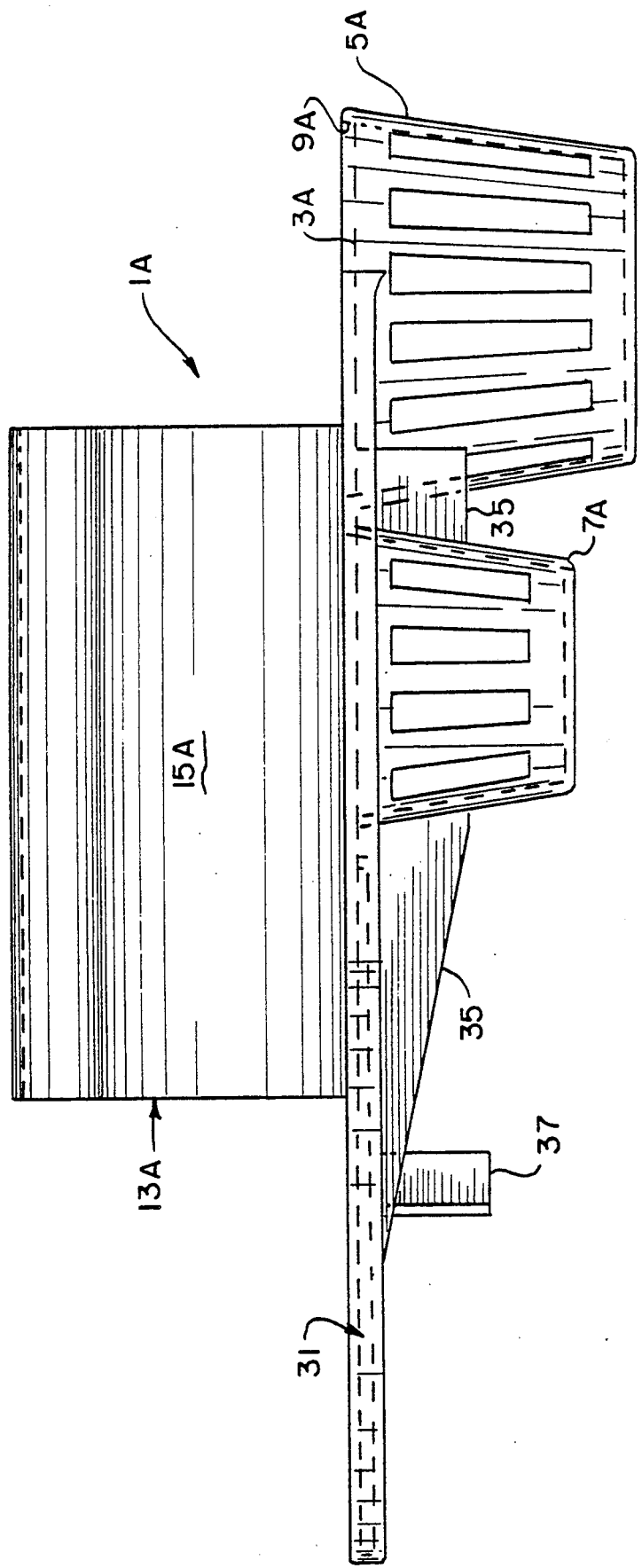
FIG. 7 is a front elevation of the tray of FIG. 6.

Perhaps the most distinctive difference between the two embodiments of the present invention concerns the support hooks. Support hook 13A is also integrally attached to and supports the one-piece plastic molded tray IA. It also has a generally U-shaped configuration including an inner wall portion 15A, a connecting wall portion 17A which extends generally outwardly from the inner wall portion 15A, and an outer wall portion 19A which extends downwardly from connecting wall portion 17A in generally parallel relationship to inner wall portion 15A. The outer wall portion 19A is shaped, configured and dimensioned (see FIGS. 8 and 9) to be wedgingly and detachably received in the space between a vehicle door frame and the associated window. More specifically, it is tapered as shown in FIG. 8, and is generally Y-shaped as shown in FIG. 9. An opening 39 is formed in top portion 17A and outer portion 19A as shown.

In this embodiment inner wall portion 15A is not generally straight. Rather it is S-shaped, as best seen in FIG. 8. This configuration allows the support hook to accept many different sizes of door frames while still holding the tray generally perpendicularly to the door. Inner wall portion 15A must be resilient to accomplish this dual function, yet strong enough to support the weight of the food products placed upon the tray.

From the foregoing, it will be appreciated that the one-piece molded plastic trays of the present invention enables an automobile driver/occupant to eat while driving or riding in an automobile. Food products are conveniently and securely held within the tray, until desired by the driver. Convenience and accessibility of the food products, without detracting from driving safety, is also made possible. Thus, while there have been numerous prior art designs employing some of the components of the one-piece molded plastic tray of the present invention, none have offered the simplicity, convenience and adaptability of a convenience food tray which is detachably, but securely retained in handheld reaching distance without affecting safe operation of the vehicle.

In view of the above, it will be seen that the several objects and features of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A one-piece molded plastic tray comprising a generally flat surface forming a top level of the tray, a plurality of integrally molded compartments depending from said generally flat surface, at least one of said compartments being generally round in cross section to accept a beverage container and another of said compartments being generally rectangular in cross section to accept a handheld food product, a sandwich receiving area defined on the generally flat surface generally on the top level of the tray, said sandwich receiving area being of a size and shape to receive a handheld sandwich, said sandwich receiving area being disposed adjacent one of said integrally molded compartments, an upstanding peripheral wall section extending circumferentially around at least part of said generally flat surface and the molded compartments thereof, said wall section defining the periphery of at least part of the sandwich receiving area, said tray further including a supporting hook section integrally attached to and supporting said tray along one side thereof, said supporting hook section having a generally U-shaped configuration including an inner wall portion adjacent to and extending upwardly from said tray, a connecting wall portion extending outwardly from said inner wall portion and an outer wall portion extending downwardly from said connecting wall portion in generally parallel relationship to said inner wall portion, said outer wall portion being shaped, configured and dimensioned to be wedgingly and detachably received in the space between a vehicle door frame and associated glass window in order to support said tray in a generally horizontal position while beverage containers and handheld food products are received within the molded compartments of said tray, said inner wall portion being generally S-shaped and being composed of a resilient material which deforms to accommodate vehicle door frames of various sizes yet has enough strength to hold the generally flat surface substantially perpendicular to the vehicle door frame when food items are placed thereon.

2. The one-piece molded plastic tray as set forth in claim 1 wherein the sandwich receiving area, the handheld food accepting compartment and the beverage accepting compartment are disposed generally in a line with the handheld food accepting compartment disposed between the sandwich receiving area and the beverage accepting compartment.

3. The one-piece molded plastic tray as set forth in claim 2 wherein the sandwich receiving area is disposed at one end of the tray and the beverage accepting compartment is disposed at the opposite end of the tray, and wherein the width of the tray tapers downwardly from the sandwich receiving area to the beverage accepting compartment.

4. The one-piece molded plastic tray as set forth in claim 2 wherein the handheld food product accepting compartment is disposed with its longer sides transverse to a line between the sandwich receiving area and the beverage accepting compartment.

5. The one-piece molded plastic tray as set forth in claim 1 wherein the outer wall portion of the supporting hook section is generally Y-shaped.

6. The one-piece molded plastic tray as set forth in claim 1 wherein the beverage accepting compartment is deeper than the handheld food product accepting compartment.

* * * * *